(12) United States Patent
Teo et al.

(10) Patent No.: US 7,597,486 B2
(45) Date of Patent: Oct. 6, 2009

(54) MANAGING BACKREFLECTION

(75) Inventors: Tat Ming Teo, Singapore (SG); Wendy Pei Fen Lau, Singapore (SG); Songyang Li, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/864,668

(22) Filed: Sep. 28, 2007

(65) Prior Publication Data
US 2008/0085078 A1    Apr. 10, 2008

Related U.S. Application Data

(60) Provisional application No. 60/828,166, filed on Oct. 4, 2006.

(51) Int. Cl.
*G02B 6/36*  (2006.01)
*G02B 6/34*  (2006.01)

(52) U.S. Cl. .............................. 385/92; 385/35; 385/36; 385/88; 385/93

(58) Field of Classification Search ............. 385/35–36, 385/88, 92–93
See application file for complete search history.

(56) References Cited

U.S. PATENT DOCUMENTS 6,842,467 B1 * 1/2005 Aronson et al. ............... 372/27

2006/0098925 A1 * 5/2006 Nakanishi et al. ............. 385/93

OTHER PUBLICATIONS

Tat Ming Teo and Songyang Li, Surface Warp Resistant Optical Devices, United States Patent Application, filed Sep. 28, 2007.
VS (VitroStub)-receptacle, ToTo: Precision Ceramics & Optical Components, 2 pgs, available at: http://www.toto.co.jp/E_Cera/vitro_stub_receptacle.htm.

* cited by examiner

*Primary Examiner*—Frank G Font
*Assistant Examiner*—Michael P Mooney
(74) *Attorney, Agent, or Firm*—Workman Nydegger

(57) ABSTRACT

In one example, an optical device includes a body having a first surface and a second surface. At least a portion of the body is formed from a material that is transmissible to light. The body is configured to be positioned in an optical subassembly along an axis defined between an optoelectronic transducer and a port configured to receive an optical fiber. The axis is defined between a point on an optically active portion of the optoelectronic transducer and a point on a surface of the optical fiber. The first surface of the body is positioned at a first angle relative to a plane that is perpendicular to the axis. The second surface of the body is positioned at a second angle relative to the plane. The first surface and the second surface are positioned at respective opposing ends of the body.

15 Claims, 7 Drawing Sheets

MANAGING BACKREFLECTION

CROSS-REFERENCE TO A RELATED APPLICATION

This application claims priority to U.S. Provisional Patent Application Ser. No. 60/828,166, filed on Oct. 4, 2006, which is incorporated herein by reference in its entirety.

BACKGROUND

Fiber optic technology is increasingly employed in the transmission of data over communication networks. Networks employing fiber optic technology are known as optical communication networks, and are typically characterized by high bandwidth and reliable, high-speed data transmission.

To communicate over an optical communication network using fiber optic technology, fiber optic components such as fiber optic transceivers or transponders are used to transmit and receive optical signals. Generally, a fiber optic transceiver includes one or more optical sub-assemblies ("OSAs") having an optical transducer. For example, transmitter optical sub-assemblies ("TOSAs") have an optoelectronic transducer for transmitting optical signals, and receiver optical sub-assemblies ("ROSAs") have an optoelectronic transducer for receiving optical signals. More particularly, a TOSA receives an electrical data signal and converts the electrical data signal into an optical data signal for transmission onto an optical network. A ROSA receives an optical data signal from the optical network and converts the received optical data signal to an electrical data signal for further use and/or processing. Both the ROSA and the TOSA include specific optical components for performing such functions.

In particular, a typical TOSA includes an optical transmitter such as a light emitting diode or a laser diode for transmitting an optical signal to an optical fiber. The optical transmitter is typically covered by an at least partially transparent cap that protects the optical transmitter while allowing the optical transmitter to transmit the optical signal to the optical cable. The cap may include a lens for focusing the optical signal transmission.

A typical ROSA includes an optical receiver, such as a PIN photodiode or avalanche photodiode ("APD"). The optical receiver is typically covered by an at least partially transparent cap that protects the optical receiver and allows the optical receiver to receive an optical signal from an optical cable. The cap may include a lens for focusing the optical signal transmission received from the optical cable.

One common problem in OSAs is backreflection. The term "backreflection" as used herein refers to a portion of an optical signal that is inadvertently reflected back towards the source of the optical signal. Backreflection can be problematic when the source of an optical signal is a sensitive optoelectronic transmitter. For example, the performance of some types of lasers, such Fabry-Perot lasers, can be affected by incident backreflection. The incident backreflection can act as undesirable optical noise that can interfere with optical signals produced by a laser. Backreflection can be problematic whether it occurs within a TOSA containing a sensitive optoelectronic transmitter, such as a Fabry-Perot laser, or whether it occurs in a distant ROSA, such as a ROSA connected to the TOSA by way of an optical cable.

Several attempts have been made at managing backreflection in OSAs. One such attempt involves the use of multiple components. However, such approaches generally add cost and complexity to the OSAs and/or are only marginally effective at managing backreflection within the OSAs. Therefore, a need exists for a solution to manage backreflection within OSAs.

SUMMARY OF EXAMPLE EMBODIMENTS

In general, example embodiments relate to managing backreflection in various environments including, for example, optical sub-assemblies.

In one example embodiment, an optical device includes a body having a first surface and a second surface. At least a portion of the body is formed from a material that is transmissible to light. The body is configured to be positioned in an optical sub-assembly along an axis defined between an optoelectronic transducer and a port configured to receive an optical fiber. The axis is defined between a point on an optically active portion of the optoelectronic transducer and a point on a surface of the optical fiber. The first surface of the body is positioned at a first angle relative to a plane that is perpendicular to the axis. The second surface of the body is positioned at a second angle relative to the plane. The first surface and the second surface are positioned at respective opposing ends of the body.

In another example embodiment, an optical sub-assembly includes a barrel that defines a port configured to receive an optical fiber, an optoelectronic transducer at least partially positioned within the barrel, and an axis defined between a point on an optically active portion of the optoelectronic transducer and a point on a surface of the optical fiber. The optical sub-assembly also includes a means for managing backreflection. The means serves to redirect an optical signal at least twice as the optical signal travels between the optoelectronic transducer and the port.

In yet another example embodiment, an optoelectronic module includes a printed circuit board, a transmitter optical sub-assembly (TOSA) electrically connected to the printed circuit board, and a receiver optical sub-assembly (ROSA) electrically connected to the printed circuit board. At least one of the TOSA or the ROSA includes a barrel, an optoelectronic transducer at least partially positioned within the barrel, a port defined by the barrel and configured to receive an optical fiber, an axis defined between a point on an optically active portion of the optoelectronic transducer and a point on a surface of the optical fiber, and an optical device positioned along the axis between the optoelectronic transducer and the port. The optical device includes a body at least a portion of which is formed from a material that is transmissible to light. The body includes a first surface and a second surface. The first surface is positioned at a first angle relative to a plane that is perpendicular to the axis. The second surface is positioned at a second angle relative to the plane. The first surface and the second surface are positioned at respective opposing ends of the body.

BRIEF DESCRIPTION OF THE DRAWINGS

To further develop the above and other aspects of example embodiments of the present invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention nor are they necessarily drawn to scale. Example embodiments of the invention will be disclosed and explained with additional specificity and detail through the use of the accompanying drawings in which.

DETAILED DESCRIPTION OF EXAMPLE EMBODIMENTS

Example embodiments of the present invention relate to managing backreflection in various environments including, for example, optical sub-assemblies. One example embodiment is an OSA that includes an optical device that is configured to manage backreflection, in part, by redirection of an optical signal within the OSA. This redirection of the optical signal reduces the likelihood that any backreflection will be incident upon an optoelectronic transducer within the OSA.

The example OSAs disclosed herein can be configured, for example, as transmitter optical sub-assemblies ("TOSAs") having an optoelectronic transducer for transmitting optical signals, or receiver optical sub-assemblies ("ROSAs") having an optoelectronic transducer for receiving optical signals. These example OSAs can be integrated into a variety of modules, such as optoelectronic transmitter, receiver, transceiver and/or transponder modules. These modules can be configured for optical signal transmission and reception at a variety of per-second data rates including, but not limited to, 1 Gbit, 2 Gbit, 2.5 Gbit, 4 Gbit, 8 Gbit, 10 Gbit, 10.3 Gbit, 10.5 Gbit, or higher. Further, the modules can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Also, the modules can be configured to support various communication protocols including, but not limited to, Fast Ethernet, Gigabit Ethernet, 10 Gigabit Ethernet, and 1×, 2×, 4×, and 10× Fibre Channel. Further, the modules can be configured to operate at various temperature ranges including, but not limited to, 0° C. to 70° C. or −40° C. to 85° C. In addition, the modules can be configured to have a variety of different form factors that are substantially compliant with MSAs including, but not limited to, SFF, SFP, SFP+, GBIC, XFP, XPAK, or X2.

Figures 1A, 1B:
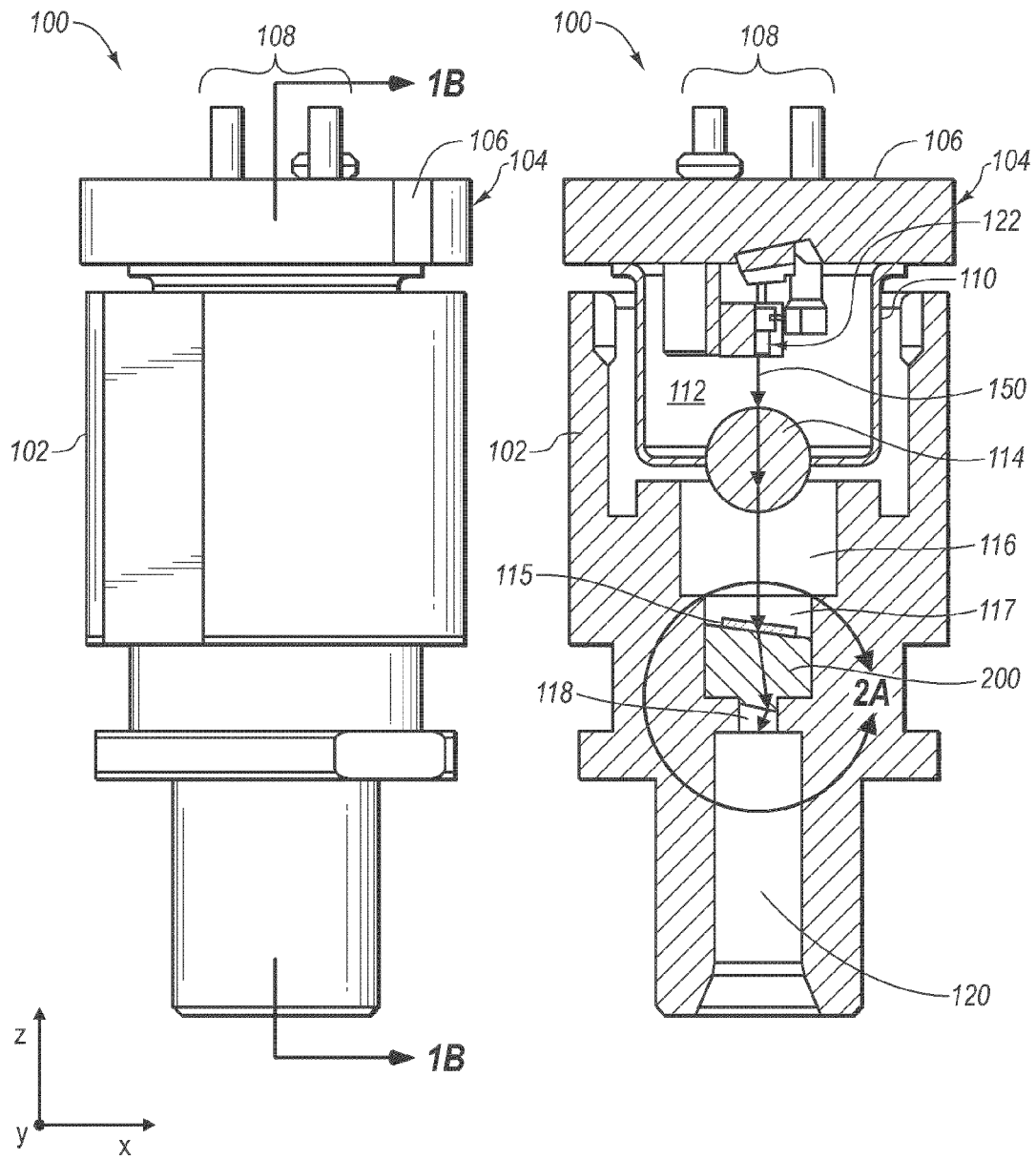
FIG. 1A discloses an example optical sub-assembly.
FIG. 1B is a cross-section of the example optical sub-assembly of FIG. 1A.
Figure 1C:
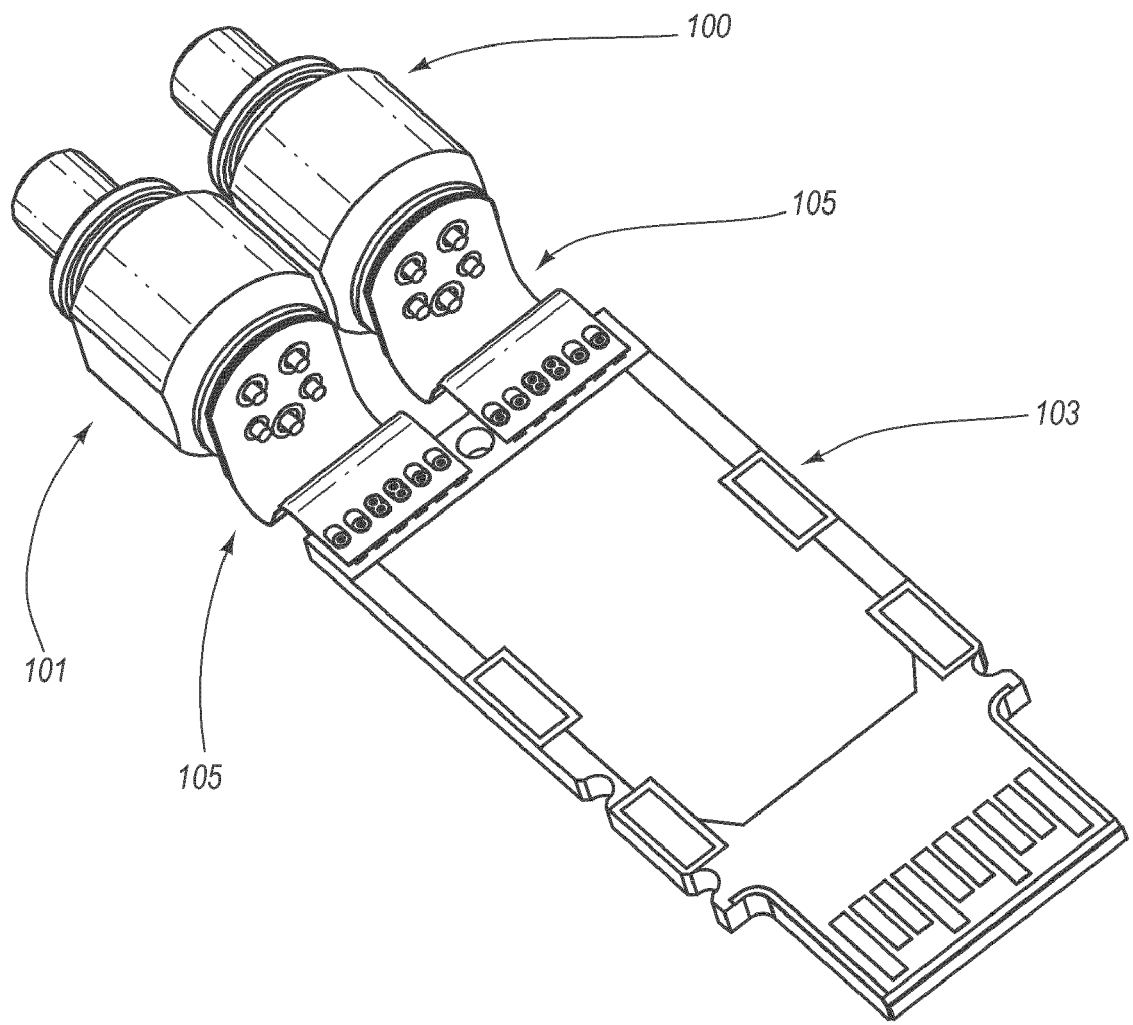
FIG. 1C discloses aspects of an example optoelectronic module.

FIGS. 1A and 1B disclose various aspects of an example OSA 100. The OSA 100 is a TOSA in this example. The OSA 100 includes a barrel 102 that is connected to a TO-can 104. As disclosed in FIG. 1B, the TO-can 104 is partially positioned within the barrel 102. The TO-can 104 includes a header 106 with multiple electrical leads 108 that are configured to electrically connect components of the TO-can 104 with a printed circuit board and associated circuitry of a module into which the OSA 100 can be assembled. The leads 108 enable electrical power, control, and data signals to be transmitted to the OSA 100 from the printed circuit board 103 and from the OSA 100 to the printed circuit board 103. For example, as disclosed in FIG. 1C, the TOSA 100, along with a ROSA 101, can be electrically connected to a printed circuit board 103 and associated circuitry (not shown) via electrical connects 105. With reference again to FIGS. 1A and 1B, the TO-can 104 also includes a cap 110 connected to the header 106. In at least some embodiments, the cap 110 creates an air-tight evacuated enclosure 112 for various TO-can components, as disclosed elsewhere herein. The TO-can 104 may also optionally include a lens 114 and/or other optical components, which may be partially positioned in the cap 110. Although the illustrated lens 114 is a ball lens, lens 114 can be another type of lens including, but not limited to, a half-ball lens or an aspherical lens. Alternatively, the lens 114 can be omitted where at least the corresponding portion of the cap 110 is light-transmissible, or the lens 114 can be replaced with a window fitted in the cap 110.

The example OSA 100 defines a first cavity 116 in communication with a second cavity 117, both of which are defined by the barrel 102. The first and second cavities 116 and 117 can be evacuated or can contain some kind of gas such as air. The OSA 100 also includes an optical device 200 for managing backreflection. The optical device 200 is discussed in greater detail below in connection with FIGS. 2A and 2B. In this example embodiment, the optical device 200 is positioned within the second cavity 117. The example OSA 100 may also optionally include a quarter wave plate 115 and/or other optical components, which may be positioned, for example, in the second cavity 117.

The OSA 100 further includes a third cavity 118 defined by the barrel 102. The third cavity 118 is opposite the second cavity 117. Proximate the third cavity 118 is a port 120. The port 120 is defined in one end of the barrel 102. The port 120 is configured to receive or otherwise interface with an end of an optical fiber in order to facilitate the physical and optical coupling of the optical fiber to the OSA 100. In another embodiment, the port 120 can be configured to receive an optical connector corresponding to any type of optical waveguide in order to facilitate the coupling of the optical waveguide to the OSA 100. When the optical device 200 is used in conjunction with the quarter wave plate 115, the quarter wave plate 115 can be positioned anywhere between the laser 122 and the lens 114, between the lens 114 and the optical device 200, or between the optical device 200 and the port 120.

As noted earlier, the TO-can may include various components. For example, the example TO-can 104 of the OSA 100 includes a transmitter 122 positioned within the evacuated enclosure 112. The transmitter 122 can be any type of transmitter including, but not limited to, a Fabry-Perot laser, DFB laser, or other edge emitter. The transmitter 122 can also be a VCSEL or LED. The transmitter 122 uses the power supplied by the leads 108 to convert an electrical data signal, also supplied by the leads 108, into a corresponding optical data signal 150.

In the example of FIGS. 1A and 1B, the OSA 100 is configured such that the optical data signal 150 generated by the transmitter 122 passes into the evacuated enclosure 112 and through the lens 114 which focuses and/or otherwise processes the optical data signal 150. The optical data signal 150 then passes from the lens 114 through the first cavity 116, through the second cavity 117, through the quarter wave plate 115, through the optical device 200, through the third cavity 118, and into the port 120. When an optical connector of an optical cable (not shown) is plugged into the port 120, the optical data signal 150 can enter into the optical fiber of the optical cable, and thereby be transported to another component through the optical cable. As the optical data signal 150 passes through the optical device 200, the optical device 200 redirects the optical data signal 150 one or more times before the optical data signal 150 enters the optical fiber. Among other things, this redirection avoids, or at least reduces, performance degradation of the transmitter 122 due to backreflection of the optical data signal 150 to optically active portions of the transmitter 122.

Figure 2A:
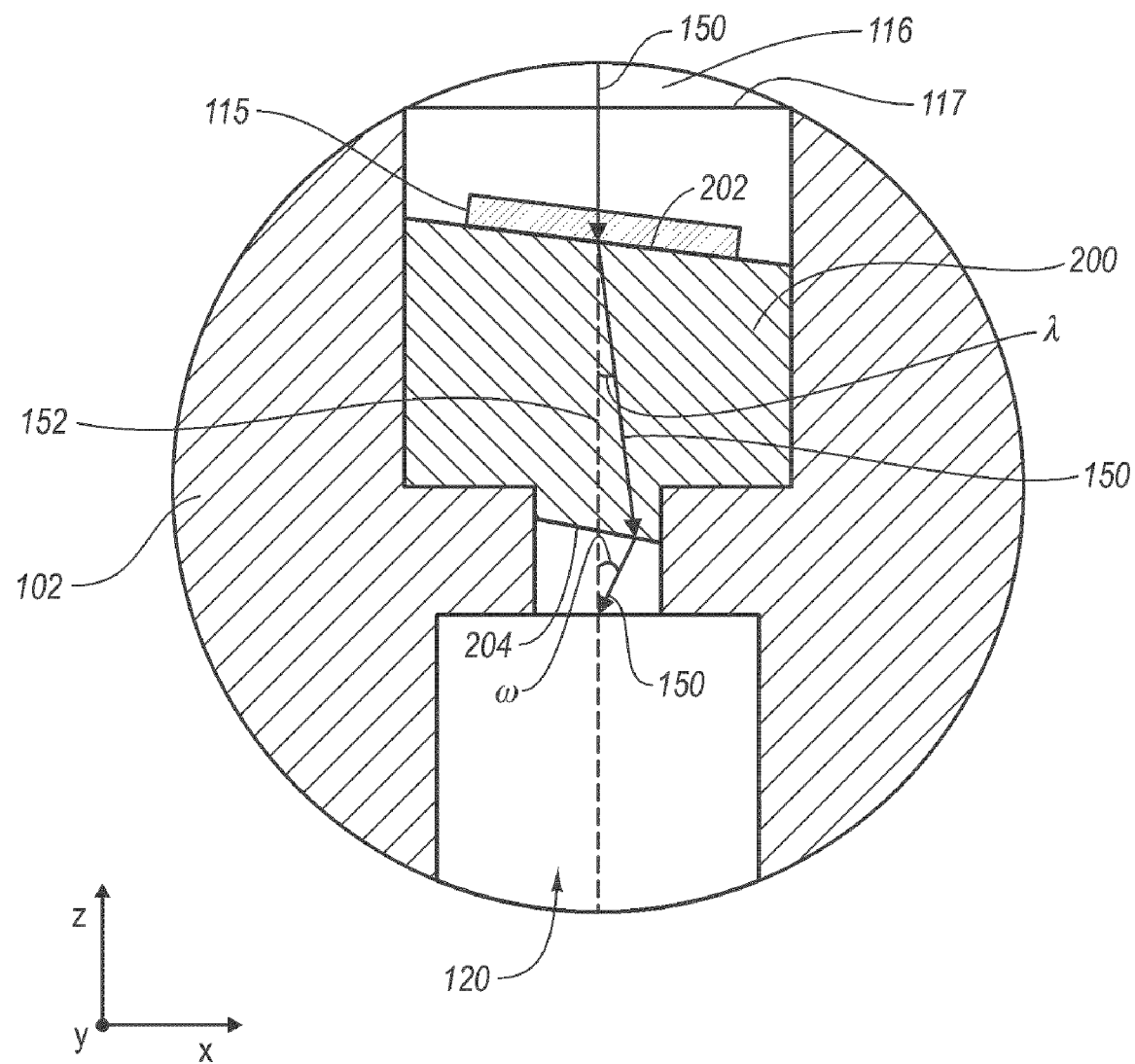
FIG. 2A discloses an example of an optical device configured to manage backreflection in the optical sub-assembly of FIGS. 1A and 1B.

With continued reference to FIGS. 1A and 1B, and now with reference also to FIG. 2A, aspects of an example optical device 200 are disclosed in greater detail. A variety of means may be employed to perform the functions of the example optical device 200. Thus, the disclosed configurations of the example optical device 200 comprise example structural implementations of various means for managing back reflection.

Accordingly, it should be understood that such structural implementations are disclosed herein solely by way of example and should not be construed as limiting the scope of the present invention in any way. Rather, any other structure or combination of structures effective in implementing the functionality disclosed herein may likewise be employed. By way of example, in some embodiments of the example OSA disclosed herein, any light-transmissible device capable of redirecting an optical signal multiple times could be used in place of the optical device 200.

The example optical device 200 can either be separately or integrally formed with the barrel 102. In addition, at least a portion of the optical device 200 can be formed from the same material as the barrel 102, or from a different material than the barrel 102, depending on the needs of a particular application. At least a portion of the optical device 200 can be formed from any light-transmissible material including, but not limited to, any light transmissible glass or plastic. For example, one or both of the optical device 200 and the barrel 102 can be formed from standard, unfilled polyetherimide. The material from which at least a portion of the optical device 200 is formed must be light transmissible in order to allow the optical data signal 150 to pass through at least a portion of the optical device 200.

Although the example optical device 200 has a substantially circular perimeter in the embodiment disclosed in FIG. 1B, the perimeter of the example optical device 200 can be substantially any shape including, but not limited to, triangular, rectangular, polygonal, or any other uniform or non-uniform shape.

The optical device 200 includes two angled surfaces through which the optical data signal 150 must pass in order to exit the OSA 100. The two angled surfaces are positioned at respective opposing ends of the optical device 200. The term "angled" as used herein refers to a surface that is offset by some angle from a plane that is perpendicular to an axis defined between a point on an optically active portion of an optoelectronic transducer and a point on a surface of the optical fiber. For example, as disclosed in FIG. 2B, a first surface 202 of the optical device 200 is positioned at a first angle α relative to a plane 203 that is perpendicular to an axis 152. Further, a second surface 204 of the optical device 200 is positioned at a second angle β relative to a plane 205 that is perpendicular to the axis 152. The axis 152 is defined between a point on an optically active portion of the transmitter 122 and a point on a face 206 of an optical fiber 208.

As indicated in FIG. 2A, the optical device 200 is positioned within the barrel 102 such that the optical data signal 150 must pass through the optical device 200 in order to exit the OSA 100 through the port 120. Particularly, the optical data signal 150 is incident first on the first surface 202 and then exits the optical device 200 through the second surface 204. In one example embodiment, the first angled surface 202 can optionally be coated with an anti-reflective coating to help reduce or avoid backreflection as the optical data signal 150 is incident upon, and passes through, the first angled surface 202.

In general, the magnitude of the redirection of the optical data signal 150 by the optical device 200 is a function of variables such as the surface angles α and β of the first and second surfaces 202 and 204, respectively. Thus, various desired effects can be achieved through variations to one or both of the surface angles of the first and second surfaces 202 and 204.

As the optical data signal 150 passes through the first angled surface 202, the angle of the first angled surface 202 causes the optical data signal 150 to be redirected by "λ" degrees off the axis 152. Similarly, as the optical data signal 150 passes through the second angled surface 204, the angle of the second angled surface 204 causes the optical data signal 150 to be redirected at an angle of "ω" degrees off the axis 152 as the optical data signal 150 approaches an optical fiber plugged into the port 120. In general, the angle "ω" falls within or near the numerical aperture of an optical fiber plugged into the port 120. The numerical aperture of an optical fiber is the range of angles over which the optical fiber can accept light. Therefore, the angle "ω" being within the numerical aperture of an optical fiber allows the optical data signal 150 to be accepted by the optical fiber.

Figure 2B:
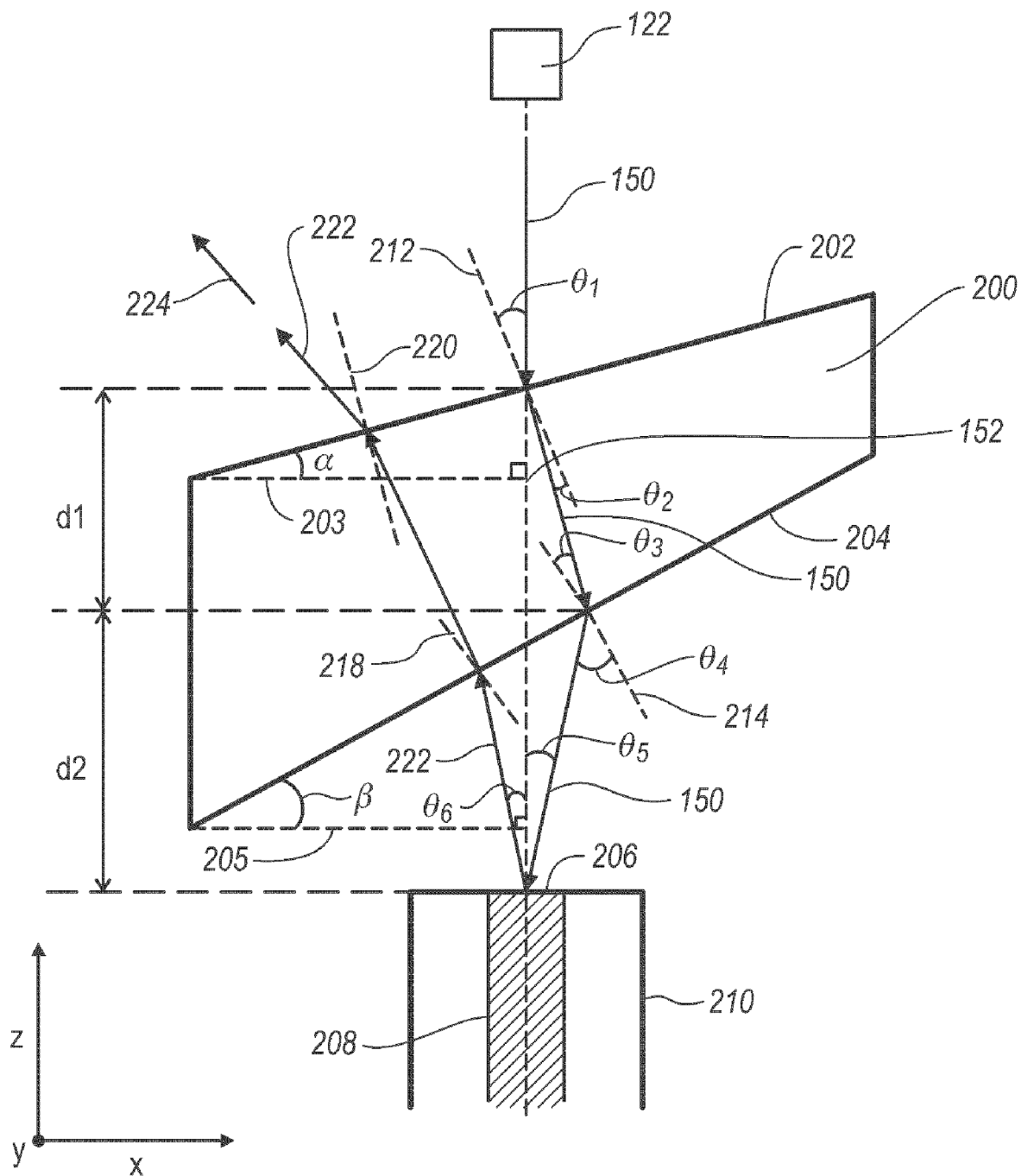
FIG. 2B discloses aspects of an example design methodology for the optical device of FIG. 2A.

With reference now to FIG. 2B, aspects of an example of a design methodology for the example optical device 200 are disclosed. In general, FIG. 2B discloses an optical cable 210 positioned relative to the optical device 200 in the position that the cable 210 would be positioned were it plugged into the port 120 of the OSA 100 of FIGS. 1A-2A. FIG. 2B discloses a first distance $d_1$ and a second distance $d_2$. The first distance $d_1$ is defined as the distance along the Z axis between the points where the optical data signal 150 enters through the first surface 202 and exits through the second surface 204, respectively. The second distance $d_2$ is defined as the distance along the Z axis between the point where the optical data signal 150 exits through the second surface 204 and the point where the optical data signal 150 is incident upon a face 206 of an optical fiber 208. The optical fiber 208 may comprise a portion of the optical cable 210 that is plugged into the port 120, as disclosed in FIGS. 1B and 2A. In one example embodiment, the first distance $d_1$ is approximately equal to the second distance $d_2$, while, in other embodiments, the first distance $d_1$ and the second distance $d_2$ are not equal to each other.

With continuing reference to FIG. 2B, the angle α is the angle between the first angled surface 202 and an imaginary plane 203 that is substantially perpendicular to the axis 152. The magnitude of the surface angle α of the first angled surface 202 is such that little or none of the backreflection generated as the optical data signal 150 is incident upon the first angled surface 202 will be directed back toward the transmitter 122. The angle β is the angle between the second angled surface 204 and an imaginary plane 205 perpendicular to the axis 152. In one example embodiment, the angles α and β are not equal while, in other embodiments, α and β are substantially equal to each other.

As discussed above, the extent to which the optical data signal 150 is redirected by the optical device 200 is a function of variables such as the surface angles α and β of the first and second surfaces 202 and 204, respectively. The angles $\theta_1$-$\theta_5$ disclosed in FIG. 2B are ultimately determined by the angles α and β and by the material(s) from which the optical device 200 is formed. The relative values of the angles α and β are dictated in part by the need for the optical data signal 150 to be incident upon the surface 206 proximate the center of the optical fiber 208 of the optical cable 210 and within the numerical aperture of the optical fiber 208. The normal lines 212, 214, 218, and 220 in FIG. 2B are each perpendicular to one of the angled surfaces 202 or 204 of the optical device 200.

As disclosed in FIG. 2B, one methodology for determining the angles α and β of planar surfaces can be implemented through the use of the following three equations:

$$\sin \theta_1 = n^* \sin \theta_2 \quad \quad 1)$$

$$\sin \theta_4 = n^* \sin \theta_3 \quad \quad 2)$$

$$-\theta_1 + \theta_2 - \theta_3 + \theta_4 = \theta_5 \quad \quad 3)$$

Where:

n is the refractive index of the material from which the optical device 200 is constructed;

$\theta_1$ is the angle between the optical data signal 150 and the normal line 212 before the optical data signal 150 has passed through the first angled surface 202;

$\theta_2$ is the angle between the optical data signal 150 and the normal line 212 after the optical data signal 150 has passed through the first angled surface 202;

$\theta_3$ is the angle between the optical data signal 150 and the normal line 214 after the optical data signal 150 has passed through the first angled surface 202 but before the optical data signal 150 has passed through the second angled surface 204;

$\theta_4$ is the angle between the optical data signal 150 and the normal line 214 after the optical data signal 150 has passed through the second angled surface 204; and $\theta_5$ is the angle between the optical data signal 150 and the axis 152 after the optical data signal 150 has passed through the second angled surface 204 but before the optical data signal 150 has passed through the surface 206 of the optical fiber 208 of the optical cable 210.

Turning now to an example application of the foregoing formulas, where the angle $\theta_1 = 7°$ and where the optical device 200 is formed from standard, unfilled polyetherimide having a refractive index of=1.63, then the angle $\theta_2 = 4.3°$, the angle $\theta_3 = 8°$, the angle $\theta_4 = 12.7°$, and the angle $\theta_5 = 2°$. In addition, the angle α=7° and the angle ϴ=11°. Although the optical device 200 is configured to cause the angle $\theta_5$ to be greater than 0°, the optical device 200 is also configured to ensure that the angle $\theta_5$ is not greater than the numerical aperture of the optical cable 210 that is connected to the OSA 100. As used herein, the term "numerical aperture" refers to the maximum angle to the longitudinal axis of the optical fiber 208 at which light can be launched into the optical fiber 208 of the optical cable 210. The longitudinal axis of the optical fiber 208 corresponds in this example to the axis 152.

Also disclosed elsewhere herein, backreflection can be generated in some situations when the optical data signal 150 is incident upon one or more surfaces within the OSA 100. For example, backreflection 222 can be created when a portion of the optical data signal 150 is reflected by the surface 206 of the optical fiber 208 of the optical cable 210 instead of passing through the surface 206 into the optical fiber 208. However, due to the fact that the optical data signal 150 strikes the surface 206 at the angle $\theta_5$, any backreflection 222 is directed at an angle $\theta_6$ toward the optical device 200. The angle $\theta_6$ is the angle between the backreflection 222 and the axis 152. In one example embodiment, the angle $\theta_6$ is substantially equal to the angle $\theta_5$. As disclosed in the example of FIG. 2B, the backreflection 222 is twice redirected as it passes through the second and first angled surfaces 204 and 202. This redirection, when combined with the effects of the initial angle $\theta_6$, results in a final direction of travel 224 for the backreflection 222, where the direction of travel 224 is away from the transmitter 122 as disclosed in FIG. 2B. For example, where the optical data signal 150 strikes the surface 206 at an angle $\theta_5$ of 2° off the longitudinal axis of the optical fiber 208, the final direction of travel 224 of the backreflection 222 may be 5° off the longitudinal axis of the optical fiber 208.

The example embodiments of the optical device disclosed herein can therefore be used to reduce, if not eliminate the negative effects of backreflection in OSAs in several ways. When integrated into a TOSA, for example, the first angled surface of the optical device causes a backreflection generated at the first angled surface to be redirected such that the backreflection is directed away from a sensitive optoelectronic transmitter within the TOSA. Similarly, the angled surfaces of the optical device cause a backreflection generated at the surface of an optical fiber or other optical waveguide to likewise be redirected such that the backreflection is directed away from the TOSA's transmitter. When integrated into a ROSA, the angled surfaces of the optical device can redirect a backreflection generated within the ROSA away from the ROSA's port so that the backreflection does not travel as optical feedback through an optical cable or other optical waveguide back to a sensitive optoelectronic transmitter in a distant TOSA.

Further, the example optical device disclosed herein can be integrally molded as part of a barrel of an OSA. Integrally forming the optical device as part of the barrel of an OSA enables the cost of the material from which the optical device is formed to be absorbed into the cost of the barrel. Also, integrally forming the optical device as part of the barrel of an OSA eliminates the cost of assembling the optical device into the OSA.

In an alternative to the arrangement disclosed in FIGS. 1A-2B, multiple optical devices 200 could be included within a single OSA to further isolate any backreflection within the OSA. Thus, example embodiments having multiple optical devices 200 serially arranged within an OSA are possible and contemplated. In addition, the example optical device 200 can be used in conjunction with other devices for reducing backreflection. For example, the optical device 200 can be used in conjunction with the quarter wave plate 115, as disclosed elsewhere herein, in order to achieve desired effects with respect to optical isolation against backreflection.

In another alternative to the monolithic optical device 200 disclosed in FIGS. 1A-2B, an optical device 200 can be formed from multiple portions, each made of the same material or different materials. For example, the outside perimeter of the optical device 200 can be formed from a non-light-transmissible material that can be easily attached to the inside of the barrel 102 while the central portion of the optical device can be made from a light-transmissible material.

Further, the optical device 200 can be used in other optical environments. For example, the optical device 200 can be used in any optical system or component where backreflection may be a concern.

Figure 3:
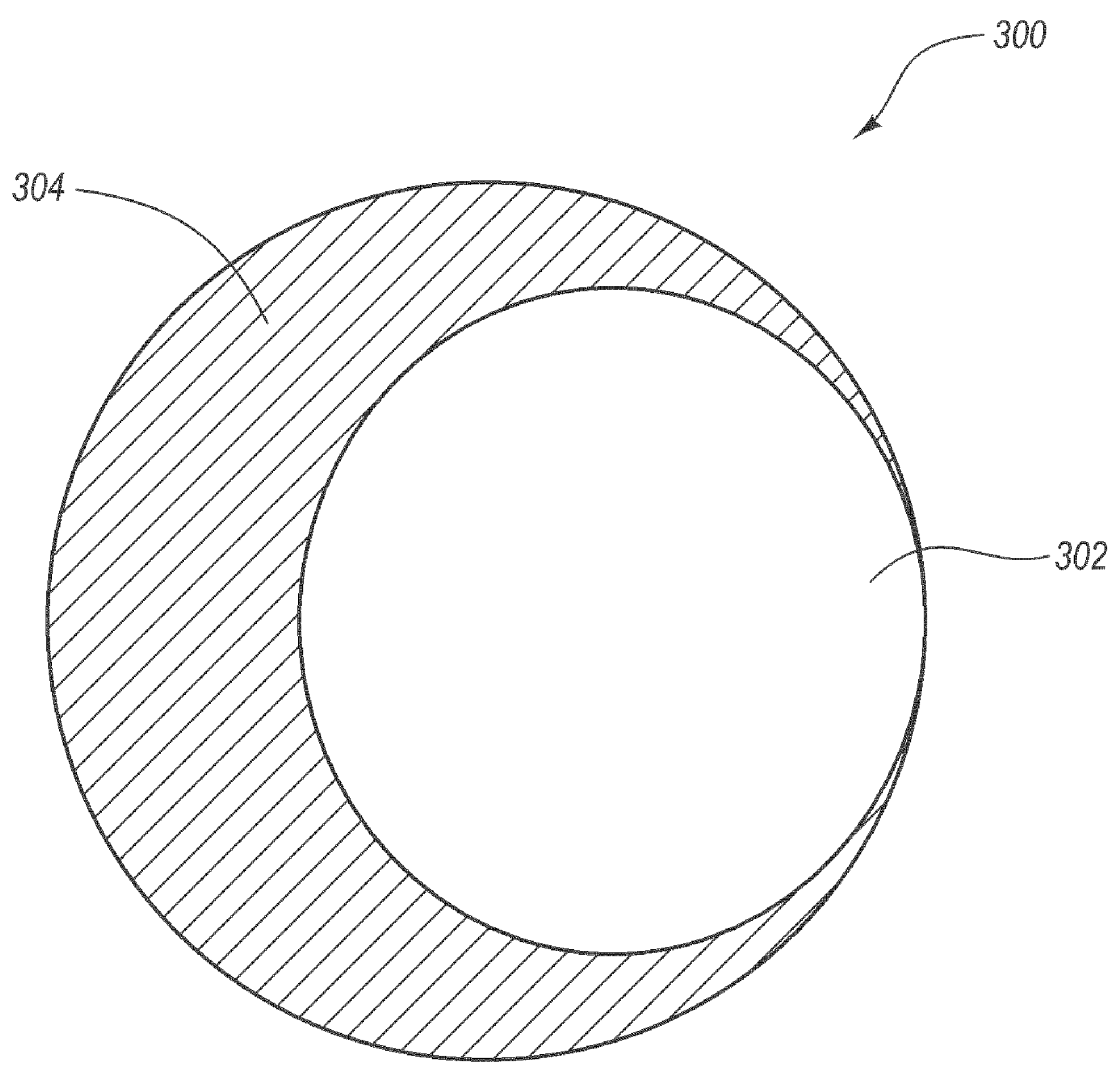
FIG. 3 discloses aspects of an example surface of the example device of FIGS. 2A and 2B.

With reference now to FIG. 3, an example surface 300 of the optical device 200 is disclosed. The example surface 300 could be implemented as the first surface 202 and/or the second surface 204 of the optical device 200 disclosed in FIGS. 2A and 2B. As disclosed in FIG. 3, the example surface includes a first portion 302 that is transmissible to light, and a second surface that is substantially non-transmissible to light. The first portion 302 can be positioned such that an optical data signal, such as the optical data signal 150 of FIGS. 2A and 2B, is incident upon the first portion 302. Similarly, the second portion 304 can be positioned such that backreflection, such as the backreflection 222 of FIG. 2B, is incident upon the second portion 304.

The second portion 304 of the surface 300 can be formed in a variety of ways. For example, the second portion 304 can be made substantially non-transmissible to light by roughening the second portion 304 of the surface 300. Alternatively, or in addition, the second portion 304 can be made substantially non-transmissible to light by masking the second portion 304 with some type of substantially non-light-transmissible coating such as paint.

The relative sizes and shapes of the first and second portion 302 and 304 can vary from those disclosed in FIG. 3. For example, the shape of the first portion 302 can be non-circular. Further, the size of the first portion 302 can larger or smaller in relation to the second portion 304 than disclosed in FIG. 3.

Figure 4A:
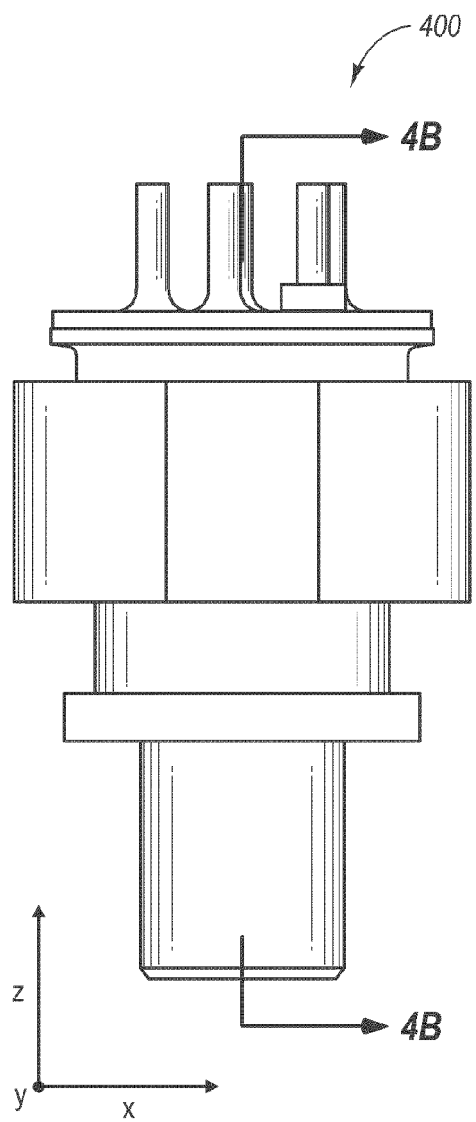
FIG. 4A discloses another example optical sub-assembly.
Figure 4B:
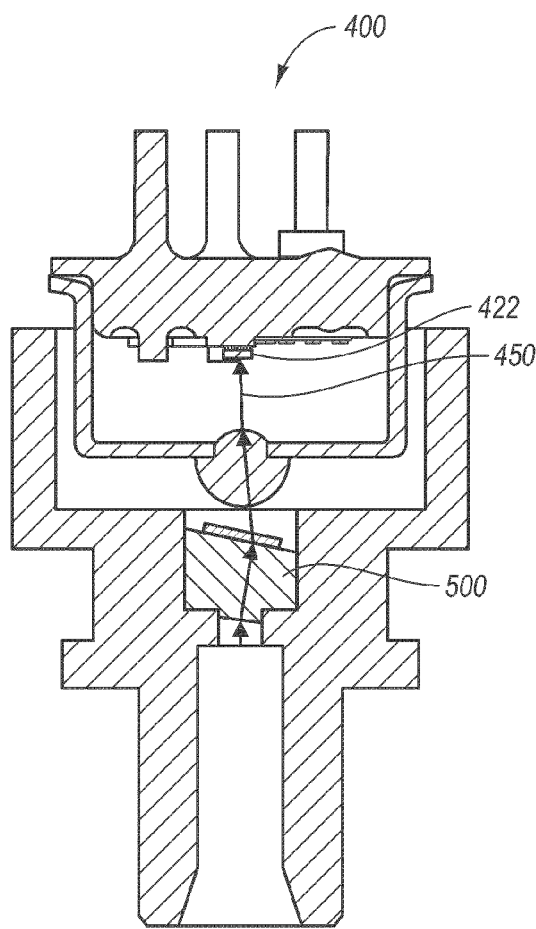
FIG. 4B is a cross-section of the example optical sub-assembly of FIG. 4A including an example optical device configured to manage backreflection.

With reference now to FIGS. 4A and 4B, another example OSA 400 is disclosed. The OSA 400 is a ROSA in this example. The OSA 400 is similar in many respects to the OSA 100. One difference is that the OSA 400 includes a receiver 422 rather than a transmitter. The receiver 422 can be a detector, for example, such as a PIN photodiode or avalanche photodiode ("APD"). Also, instead of generating an optical data signal, the OSA 400 is configured to receive an optical data signal 450. The OSA 400 includes an optical device 500 that is similar in form and function to the optical device 200 of the OSA 100.

Figure 5:
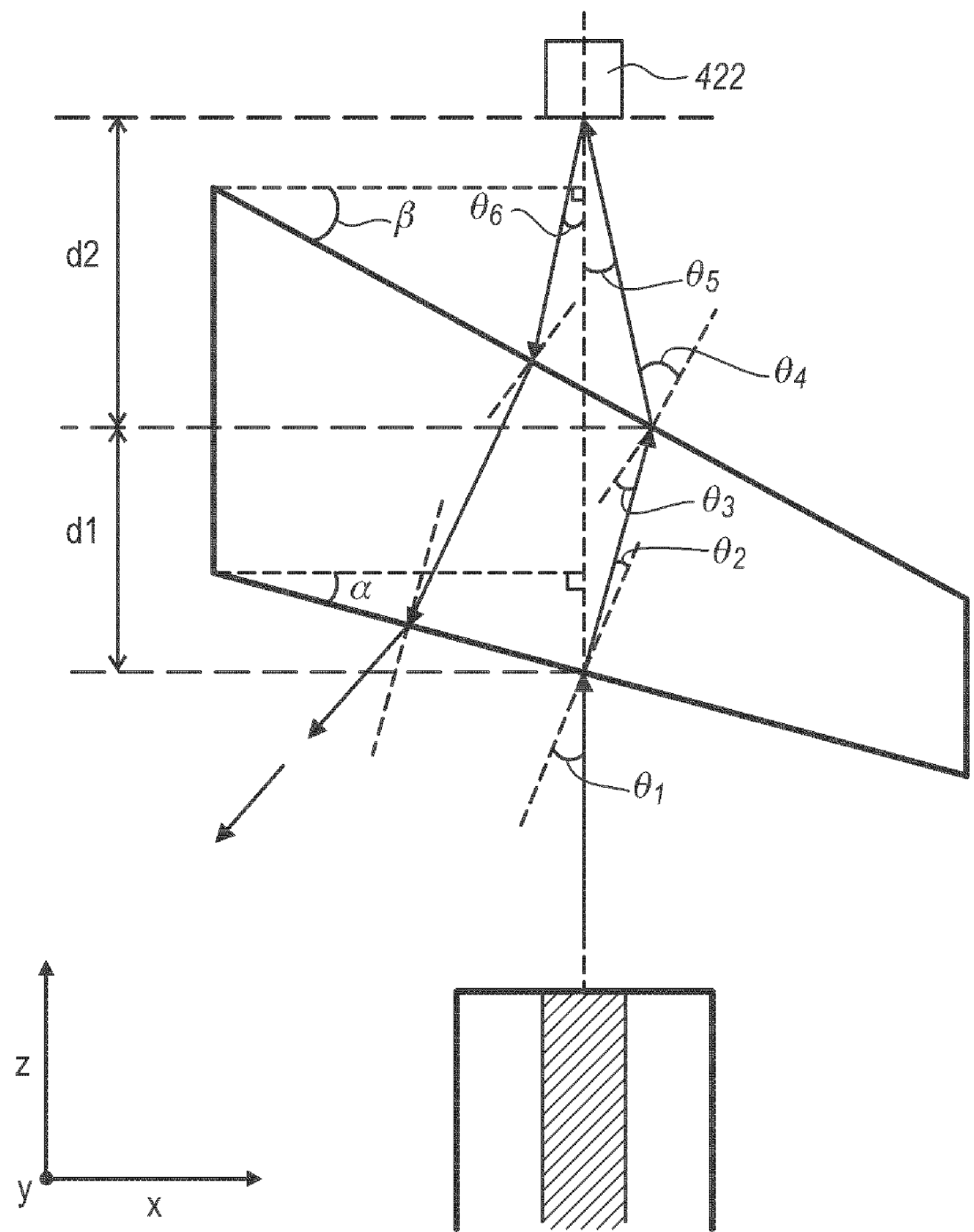
FIG. 5 discloses aspects of an example design methodology for the optical device of FIG. 4B.

With reference now to FIG. 5, additional aspects of the example optical device 500 are disclosed. As disclosed in FIG. 5, the angles α and β in the optical device 500 are in the opposite position from the angles α and β in the optical device 100, as disclosed in FIG. 2B, though that need no be the case in every embodiment.

Example embodiments of the present invention may be embodied in other specific forms. The described example embodiments are to be considered in all respects only as illustrative and not restrictive.

What is claimed is:

1. An optical device comprising:
   a body at least a portion of which is formed from a material that is transmissible to light, the body configured to be positioned in an optical sub-assembly between an optoelectronic transducer and a port configured to receive an optical fiber, wherein the optoelectronic transducer and the optical fiber collectively define an axis extending between a point on an optically active portion of the optoelectronic transducer and a point on a surface of the optical fiber, the body being configured to be positioned along the axis;
   a first surface of the body configured to be offset by a first angle from a plane that is perpendicular to the axis; and
   a second surface of the body configured to be offset by a second angle from the plane, the second angle being different from the first angle, wherein the first surface and the second surface are positioned at respective opposing ends of the body.

2. The optical device as recited in claim 1, wherein the body is formed from standard, unfilled polyetherimide.

3. The optical device as recited in claim 1, wherein at least one of the first surface or the second surface is substantially planar.

4. The optical device as recited in claim 1, wherein the first surface is coated with an anti-reflective coating.

5. The optical device as recited in claim 1, wherein at least one of the first surface or the second surface comprises:
   a first portion that is transmissible to light; and
   a second portion that is substantially non-transmissible to light.

6. The optical device as recited in claim 1, wherein the body is monolithic.

7. An OSA comprising:
   a barrel;
   an optoelectronic transducer at least partially positioned within the barrel;
   a port defined by the barrel and configured to receive an optical fiber;
   an axis defined between a point on an optically active portion of the optoelectronic transducer and a point on a surface of the optical fiber; and
   a means for managing backreflection, the means serving to redirect an optical signal at least twice as the optical signal travels between the optoelectronic transducer and the port, wherein;
   for an optoelectronic transducer that comprises an optoelectronic transmitter, the means directs an optical signal generated by the optoelectronic transmitter along a path that converges with the axis at a predetermined location, and for a reflection of the transmitted optical signal traveling toward the optoelectronic transducer, the means directs the reflection along a path that diverges from the axis; and
   for an optoelectronic transducer that comprises an optoelectronic receiver, the means directs an optical signal received from a source external to the OSA along a path that converges with the axis at a predetermined location, and for a reflection of the received optical signal, the means directs the reflection of the received optical signal along a path that diverges from the optical axis.

8. The OSA as recited in claim 7, wherein the optoelectronic transducer comprises one of a Fabry-Perot laser, a DFB laser, a VCSEL, or an LED, or a detector.

9. The OSA as recited in claim 7,
   wherein the means for managing backreflection comprises an optical device.

10. The optical device as recited in claim 1, wherein the optical device substantially conforms to the following three equations:

$$\sin \theta_1 = n^* \sin \theta_2 \qquad 1)$$

$$\sin \theta_4 = n^* \sin \theta_3 \qquad 2)$$

$$-\theta_1 + \theta_2 - \theta_3 + \theta_4 = \theta_5 \qquad 3)$$

where:
   n is a refractive index of a material from which the optical device is constructed;
   $\theta_1$ is the angle between an optical signal produced by the optoelectronic transducer and a line that is normal to the first angled surface before the optical signal has passed through the first angled surface;
   $\theta_2$ is the angle between the optical signal and the line that is normal to the first angled surface after the optical signal has passed through the first angled surface;
   $\theta_3$ is the angle between the optical signal and a line that is normal to the second angled surface after the optical signal has passed through the first angled surface but before the optical signal has passed through the second angled surface;

$\theta_4$ is the angle between the optical signal and the line that is normal to the second angled surface after the optical signal has passed through the second angled surface; and $\theta_5$ is the angle between the optical signal and the longitudinal axis after the optical signal has passed through the second angled surface but before the optical signal has passed through the surface of the optical fiber.

11. The OSA as recited in claim 9, wherein the optical device comprises a body that is monolithic.

12. The OSA as recited in claim 9, wherein the optical device comprises first and second surfaces, at least one of the first surface or the second surface comprises:
a first portion that is transmissible to light; and
a second portion that is substantially non-transmissible to light.

13. An optoelectronic module comprising:
a printed circuit board;
a transmitter optical sub-assembly (TOSA) electrically connected to the printed circuit board; and
a receiver optical sub-assembly (ROSA) electrically connected to the printed circuit board,
wherein at least one of the TOSA or the ROSA comprises:
a barrel;
an optoelectronic transducer at least partially positioned within the barrel;
a port defined by the barrel and configured to receive an optical fiber;
an axis defined between a point on an optically active portion of the optoelectronic transducer and a point on a surface of the optical fiber; and
an optical device positioned along the axis between the optoelectronic transducer and the port, the optical device comprising:
a body at least a portion of which is formed from a material that is transmissible to light;
a first surface of the body positioned at a first angle relative to a plane that is perpendicular to the axis; and
a second surface of the body positioned at a second angle relative to the plane, wherein the first surface and the second surface are positioned at respective opposing ends of the body, and one or both of the first and second surfaces comprising:
a first portion that is transmissible to light; and
a second portion that is substantially non-transmissible to light.

14. The optoelectronic module as recited in claim 13, wherein the body is monolithic.

15. The optoelectronic module as recited in claim 13, wherein the optoelectronic module substantially conforms with at least one of the following MSAs: SFF, SFP, SFP+, GBIC, XFP, XPAK, or X2.

* * * * *